United States Patent

[11] 3,633,191

[72] Inventors John Sherman Engelhardt
  Hartsdale;
  Lawrence Charles Ebel, Hastings-on-
  Hudson, both of N.Y.
[21] Appl. No. 839,571
[22] Filed July 7, 1969
[45] Patented Jan. 4, 1972
[73] Assignee Anaconda Wire and Cable Company
  New York, N.Y.
  Continuation-in-part of application Ser. No.
  580,762, Sept. 20, 1966, now Patent No.
  3,491,597. This application July 7, 1969,
  Ser. No. 839,571
  The portion of the term of the patent
  subsequent to Jan. 27, 1987, has been
  disclaimed.

[54] TEMPERATURE MONITORED CABLE SYSTEM WITH TELEMETRY READOUT
  8 Claims, 8 Drawing Figs.
[52] U.S. Cl. .................................................. 340/207 P,
  340/177 R, 73/362 R, 73/342, 340/233, 340/182
[51] Int. Cl. ......................................................... G08c 19/16
[50] Field of Search ........................................... 340/207,
  208, 227, 228, 233, 207 P, 227 C; 332/43 B, 47;
  73/342, 362, 362 R, 362 AR

[56] References Cited
UNITED STATES PATENTS

| | | | |
|---|---|---|---|
| 2,579,524 | 12/1951 | Terry et al. | 332/43 B |
| 2,937,342 | 5/1960 | Wellman | 332/16 |
| 3,347,098 | 10/1967 | Bielstein et al. | 73/362 |
| 3,453,544 | 7/1969 | Schweitzer | 340/207 |
| 3,428,896 | 2/1969 | Schweitzer | 340/207 |
| 3,491,597 | 1/1970 | Engelhardt | 73/342 |
| 3,495,173 | 2/1970 | Harner et al. | 340/207 |

Primary Examiner—John W. Caldwell
Assistant Examiner—Robert J. Mooney
Attorney—Pennie, Edmonds, Morton, Taylor & Adams ABSTRACT: In order to accurately and instantaneously measure the average temperature of a length of current carrying conductor such as a high-tension cable, a pilot wire having a conductivity which varies according to its temperature is provided a thermal communication with the conductor along its entire length, so that the conductor and pilot wire are at essentially the same temperatures but are electrically insulated from one another along their common lateral extent. A circuit is provided for measuring the conductivity and thereby the temperature of the pilot wire, and a radio telemetry transmitter transmits this information to a receiver on the ground, from which it may be retransmitted to any desired remote location. The provision of multiple pilot wires in one embodiment of the invention permits measurements of more than one segment of the conductor to be made and transmitted.

INVENTORS
JOHN SHERMAN ENGELHARDT
LAWRENCE CHARLES EBEL

BY Pennie, Edmonds
Morton, Taylor & Adams
ATTORNEYS

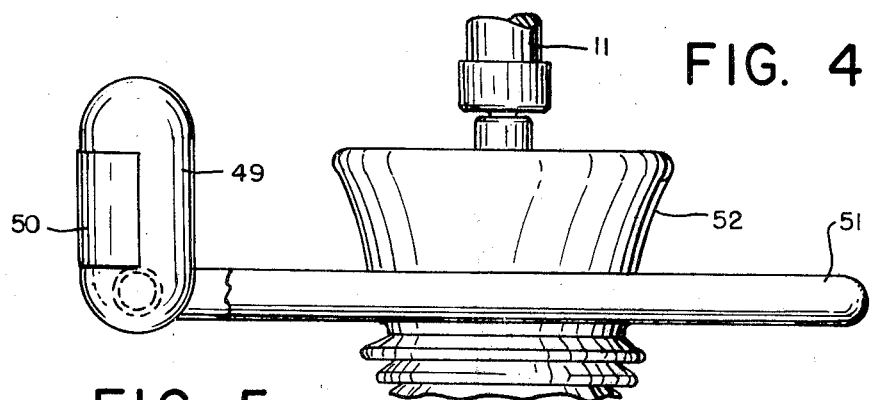
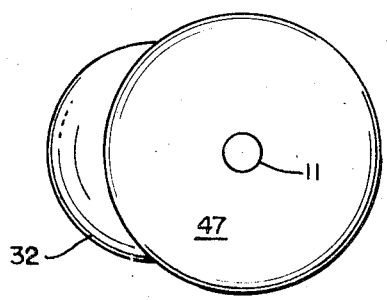
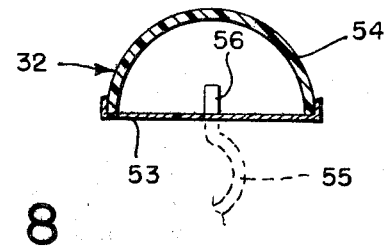
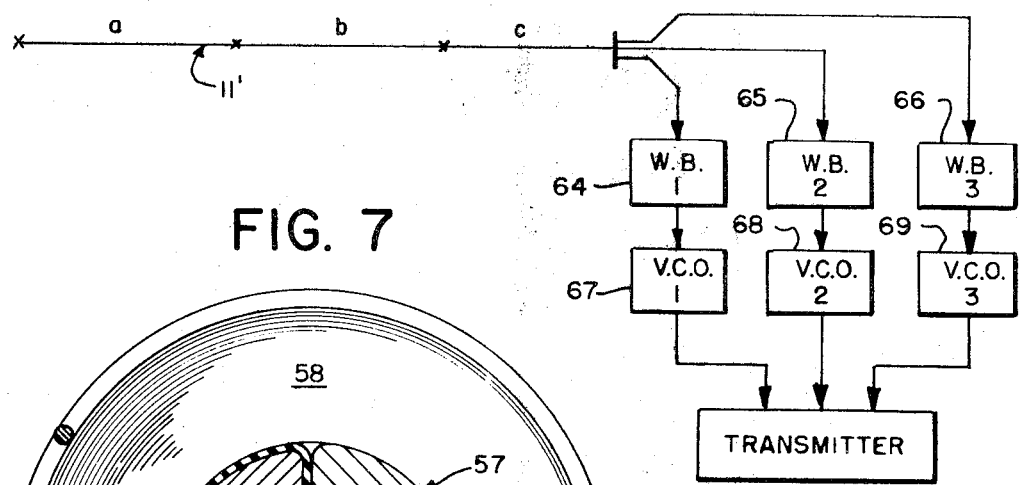
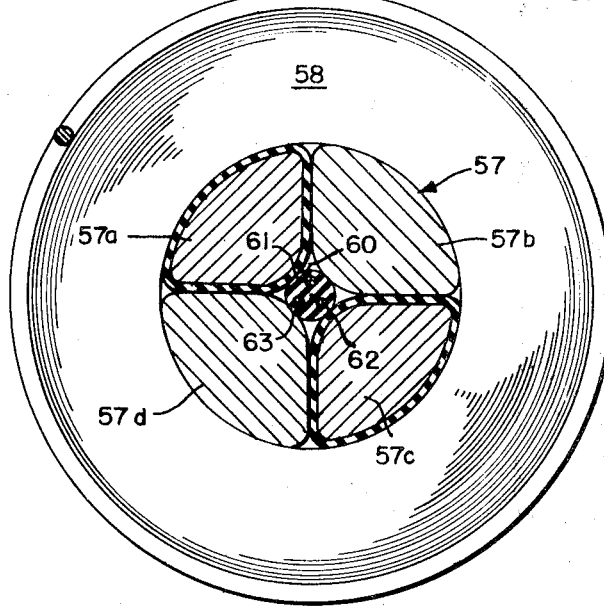

3,633,191

TEMPERATURE MONITORED CABLE SYSTEM WITH TELEMETRY READOUT

CROSS-REFERENCE TO RELATED APPLICATIONS

This application is a continuation-in-part of application, Ser. No. 580,762, filed Sept. 20, 1966, for TEMPERATURE MONITORED CABLE SYSTEM AND METHOD, now U.S. Pat. No. 3,491,597.

I. BACKGROUND OF THE INVENTION

It is often desirable to monitor the conductor temperature of electrical transmission lines, and particularly to have information on the temperature of relatively long lengths of sheathed high-tension transmission cables. Underground cable installations, for instance, particularly in arid locations, impose severe restraints on the thermal ratings of transmission cables. In such locations, the moisture content of soils is low and unpredictably variable so that thermal design calculations cannot be as accurate as is desirable. In certain climates, the unpredictability of weather conditions makes it desirable to keep a continuous watch on the temperature of transmission lines.

It is known to measure, for instance by thermocouples, the temperature at various points along the sheath of a transmission line, and this provides accurate temperature information at those discrete points. Conductor temperatures have, in the past, been derived from tables based on laboratory measurements of cable properties, field measurements of soil and weather conditions over the intended right-of-way, and general experience. A direct knowledge of the average conductor temperature is useful not only as an indication of operating temperature, but to provide a more accurate understanding of the thermal properties of transmission systems. It is not feasible, however, to provide a sufficient number of thermocouples to determine the temperature distribution along an entire transmission line.

II. BRIEF DESCRIPTION OF THE INVENTION

It has been discovered that an accurate and instantaneous indication of average temperature along a given length of transmission line conductor can be determined by measuring the temperature-dependent changes in conductance of conductive means in the form of a pilot wire embedded in or otherwise maintained in thermal communication with the conductor. Such wire is embedded in the conductor when it is manufactured, and is electrically insulated from, but in thermal communication with, the conductor along their common lateral extent.

It is advantageous to electrically short circuit the pilot wire to the conductor at one end of the length to be monitored, whereby the cable itself may be used as a return conductor. Since the cable conductor and the pilot wire are at the same temperature, any error is eliminated which might otherwise be present due to a temperature difference between the pilot wire and return conductor.

Power for making the conductance measurement is preferably derived from the cable itself, for instance through a transformer coupling to the current-carrying conductor. Since DC current is used for the measurement, the AC current derived from the cable may be rectified and, if desired, regulated before being fed to the measuring apparatus. The measuring apparatus output is connected to control a telemetry transmitter for transmitting the measured value or values to a receiver at a ground station, thereby avoiding any direct electrical connection between the high-tension environment where the measurement is made and ground.

According to one feature of the invention, the complete apparatus for measuring average temperature and for transmitting the measured value to a receiver is mounted on a pothead, so that instantaneous, reliable measurements may be directly obtained in the field. This precludes any measurement error from sources between the sensor (the pilot wire in this case) and the transmitting equipment. The housing for the apparatus on the pothead is preferably electrostatically and magnetically shielded for accurate readings.

In one embodiment of the invention, a plurality of pilot wires is provided either in a single conductor or in several conductors of multiconductor cable which are at essentially the same temperatures whereby the average temperatures of individual segments of the conductors may be selectively read out.

III. DESCRIPTION OF THE DRAWINGS

The invention will be further described with reference to the accompanying drawings, in which:

FIG. 4 is an elevational view showing the measuring and transmitting apparatus mounted on the corona ring of an insulator according to the invention;

FIG. 5 is a top view of the pothead housing of FIG. 1;

FIG. 6 is a detail view of the transmitting antenna of FIG. 1;

FIG. 7 is a sectional view of a high-voltage transmission cable with a multiple conductor pilot wire embedded in its core; and FIG. 8 is a schematic circuit diagram of an embodiment of the invention for determining the average temperature of a plurality of segments of a transmission cable.

Figure 1:
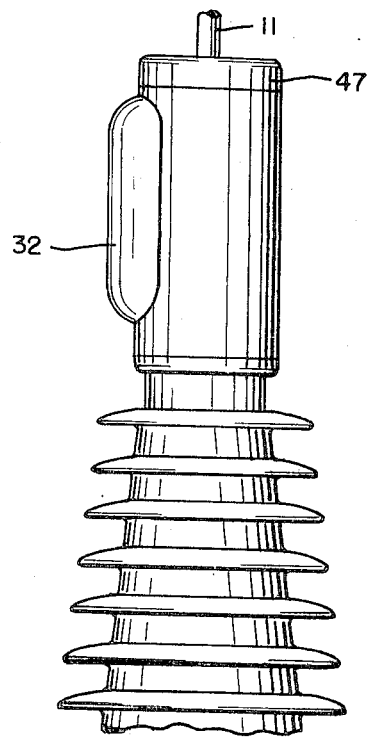
FIG. 1 is an elevational view of a temperature measuring and transmitting apparatus mounted on a pothead according to the invention.
Figure 2:
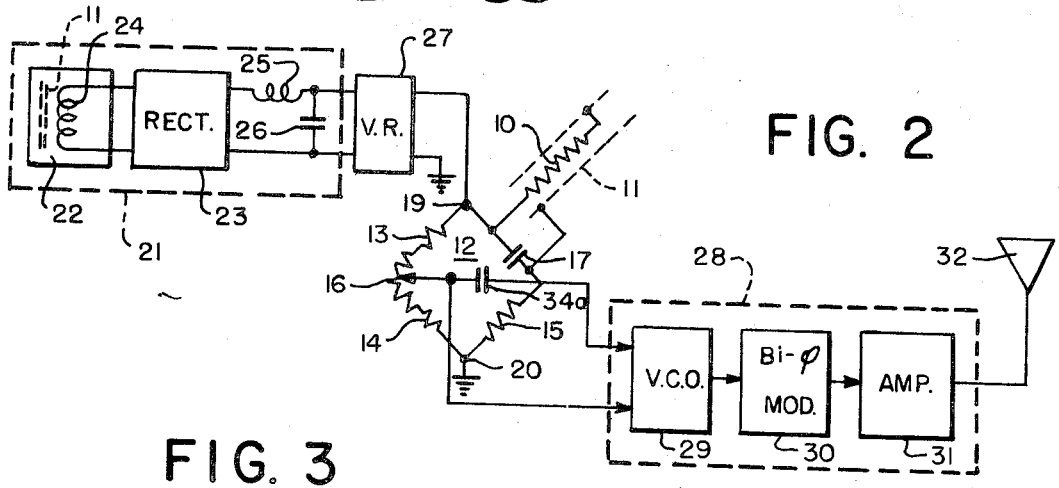
FIG. 2 is a schematic circuit diagram of a temperature measuring and transmitting apparatus housed in the pothead shown in FIG. 1.

FIG. 2 shows an embodiment of the invention in which the degree of imbalance of a Wheatstone bridge circuit is taken as an indication of the conductivity change of the pilot wire. A pilot wire 10 is embedded in the current-carrying conductor indicated schematically as 11 when the latter is manufactured. Nickel is a satisfactory material for the pilot wire. Since the method of the invention is based on the assumption that the pilot wire and the conductor to be monitored are at the same temperature, the electrical insulation between pilot wire and conductor must permit thermal communication between them. If the cable insulation is oil saturated, the pilot wire insulation should be insoluble in such oil. Nylon and cotton may be used for insulation. The pilot wire may conveniently be run along the axis of the conductor 11. The pilot wire 10 may be shorted to the conductor at one end of the length of cable to be monitored; this will be the end distant from the point at which the measuring apparatus is connected. At the other end of the length of cable, the pilot wire is brought out of the pothead through a pressure fitting (not shown). The pilot wire 10 and the return conductor 11 (in this embodiment one of the conductors of the cable) are connected in series as one arm of the Wheatstone bridge 12. The other three arms may comprise fixed resistors 13, 14 and 15 as well as a resistor 16 with a variable center tap for setting the bridge at the null point. A DC voltage is applied across one diagonal, between terminals 10 and 20, and the bridge output is derived across the other diagonal. The DC current source, shown schematically by the broken line 21, includes an AC power source 22 and a rectifier 23. The AC power source in FIG. 1 is a transformer, the primary winding of which is the current-carrying conductor 11 of the transmission cable. The secondary winding 24 of the transformer is connected to the output terminals of the AC power source 22, which are connected to rectifier 23. The rectifier 23 in FIG. 1 may be a full wave diode bridge circuit such as is well known in the art.

A voltage regulator 27 may be connected to the output of the rectifier 23 for providing a constant DC output to the Wheatstone bridge terminals 19 and 20. Such regulators are well known in the art.

Suitable filtering means is provided at the output of the rectifier for smoothing the output signal. Such filtering means in FIG. 2 includes an inductance 25 and a capacitance 26. Additional filtering is providing by a large capacitor 17 connected across the series-connected pilot wire and return conductor for reducing any AC voltages inductively generated in either of those conductors.

The DC current source 21 may alternatively be a constant voltage battery, which may be charged by current derived from the AC current in the cable conductor 11.

The output voltage from the Wheatstone bridge circuit is connected to the input of a radio-telemetry transmitter 28 which, in this embodiment of the invention, is a biphase modulator in order to minimize any radio interference from electrical discharges or transients in the power cable. Transmitter 28 includes a voltage-controlled oscillator 29, a biphase modulator 30 and a power amplifier 31, and its output is connected to a transmitting antenna 32 which, as shown in FIG. 1, is mounted integrally on the pothead housing. Power for the transmitter 28 may be supplied from the output of voltage regulator 27. Voltage-controlled oscillator 29 provides at its output a modulating signal, the frequency of which varies in accordance with the applied input voltage. The voltage controlled oscillator preferably has an output frequency on the order of 500 Hz. and may be any type of an oscillator or other voltage-to-frequency converter familiar to those skilled in this art which is compatible with the terminal and environmental conditions of the system.

Figure 3:
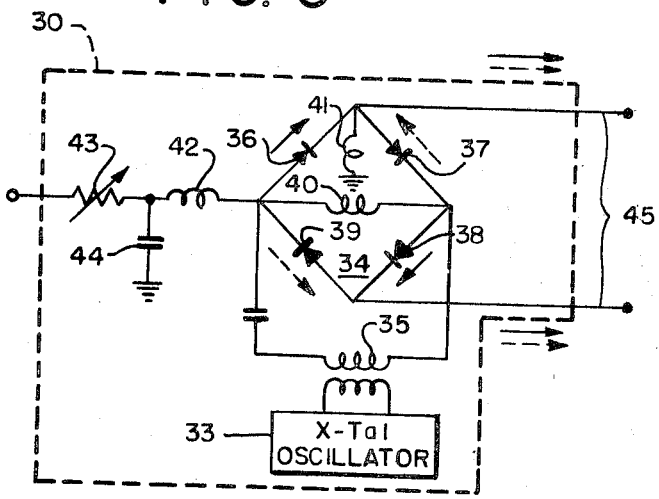
FIG. 3 is a schematic circuit diagram of the biphase bridge modulator shown in FIG. 2.

The output of voltage controlled oscillator 29 is connected to a biphase modulator 30, more clearly shown in FIG. 3. Modulator 30 includes a crystal-controlled oscillator 33 for providing a constant frequency carrier signal, which is connected across one diagonal of diode quad 34 through a transformer 35, permitting the diode quad 34 to operate in a balanced mode. Diode quad 34 includes diodes 36, 37, 38 and 39, as well as R.F. chokes 40, 41 and 42 for blocking the carrier signal while passing the modulation signal.

Variable resistor 43 may be included in the input circuit for adjusting the input level, as well as a filtering capacitor 44. When a positive modulating signal is applied the input of modulator 30, it forward biases diodes 36 and 38, which consequently present a very low input impedance to the R.F. signal generated by oscillator 33, coupling that signal to the R.F. output terminals 45. When a negative input signal is applied to modulator 30, diodes 37 and 39 become forward biased, passing the R.F. signal to output terminals 45 180° out of phase relative to the output signal produced by a positive input voltage, thereby furnishing the desired differential phase shift function. The arrows shown in solid and dashed lines in FIG. 3 indicate the respective current paths for the positive and negative modulating voltage input conditions.

The isolation of the nonconducting diodes is enhanced by virtue of the back bias applied to them by the modulating voltage. It will be seen that the magnitude of the phase shift in the output signal at terminals 45 is independent of the modulating voltage amplitude.

The output of the biphase modulator is connected to a power amplifier capable of providing about 12 milliwatts output power, which has been found satisfactory for the purpose of this embodiment of the invention. The output of power amplifier 31 is connected to a transmitting antenna 32 which, as described above, is mounted integrally with housing 47 (see FIGS. 1 and 5).

As shown in FIG. 1, the apparatus shown schematically in FIG. 2 is mounted in a housing 47 formed as an extension of a pothead which terminates the length of conductor 11. The housing may be made of aluminum or any electrically conductive material, for shielding and its edges should be rounded for corona shielding. If further corona shielding is found necessary, corona rings (not shown) may be added to the housing. Antenna 32 is a flush mounted 180° section of a right cylinder (commonly referred to as a flush antenna) having, for an output frequency on the order of 100 MHz., an 8-inch diameter and being about 8 inches in height. It is omnidirectional and vertically polarized. As shown more clearly in FIG. 6, antenna 32 includes a flat electrically conductive metal plate 53 to which is attached to a cylindrical wall 54 made of a material transparent to the radiating frequency of the antenna. Commonly, such material is a plastic such as an acrylic. The antenna is fed by a coaxial cable 55 coupled to an upstanding rod 56 or similar radiating element which extends into the cavity formed between plate 53 and wall 54. The exact dimension of the antenna in any given application will be dependent upon the frequency to be transmitted.

Magnetic shielding from the fields generated by the conductor current may also be provided by means of a laminated iron casing (not shown) around the apparatus. In addition, wires within the apparatus as well as all components thereof should be positioned to minimize any inductive pickup from the circumferential magnetic field. To minimize the effects of induced AC or surge currents, a large capacitance 34a may be connected (FIG. 2) in parallel with the output of bridge circuit 12.

Alternatively, the transmitter may be housed in a separate shielded housing 49, as shown in FIG. 4, preferably having a diameter compatible with that of the transmitter antenna 50, mounted on a corona ring 51 extending about pothead 52.

Any receiver capable of receiving the output signal generated by antenna 32 (or, more generally, which is compatible with the particular transmitter and modulation mode chosen) may be used. Such receiver may, for example, have a vertically polarized whip antenna. In the above-described embodiment of the invention, the use of a vertical polarization mode minimizes interference from horizontally polarized standard FM broadcast signals. The receiving antenna is preferably located about 10 to 50 feet from the transmitting antenna, which has been found satisfactory for good reception in the presence of strong corona noise.

The potentiometer 16 and variable resistor 43 should be adjusted after installation of the apparatus to obtain substantially zero output voltage from bridge circuit 12 (i.e., the bridge is nulled) at some convenient reference temperature below the temperature range over which the cable is expected to operate. Any rise in conductor temperature will then produce an increase in the resistance of the pilot wire 10, which increase will cause a variation in the V.C.O. input voltage by unbalancing the bridge. The degree of imbalance may be empirically related to the rise in temperature of the pilot wire at any known value of current in the conductor 11.

From a knowledge of the average temperature at any given time as well as the thermal characteristics of various segments of the length of cable being monitored, the temperature at any given point on the cable may be accurately estimated.

In the circuit of FIG. 2, if a length of cable approximately 3,000 feet in length is to be monitored, and the pilot wire shown is about No. 18 copper wire, the series resistance of the pilot wire and the conductor 11 at 25° C. will be about 18 ohms. In this case, resistances 13 and 14 may be 18 and 15 ohms respectively, and resistance 15 may be 15 ohms.

In accordance with a particular embodiment of the invention, apparatus is provided for measuring the average temperatures of a plurality of individual segments of a single cable conductor, or of individual segments of several cable conductors in a common conduit or which otherwise have equal conductor temperatures at all cross sections.

For monitoring a single cable conductor, a multiconductor pilot wire may be used as shown in FIG. 7, which is incorporated into the cable in the same manner as a single-conductor pilot wire. FIG. 7 shows a four-segment cable conductor 57 having opposite segments 57a and 57c separated from segments 57b and 57d by treated paper insulation to minimize skin effect. The conductor is wrapped in a plurality of insulating layers indicated generally as 58 encased in an outer insulating layer 59. Pilot wire 60 extends along the core of the segmented conductor and includes conductors 61, 62 and 63 which are electrically connected to segmented conductor 57 at separated points along the cable, the intervals between such points being those over which average temperatures may be determined.

FIG. 8 illustrates an embodiment of the invention wherein a high-tension cable conductor 11' contains a pilot wire (not shown) extending along its entire length, each conductor of the pilot wire being connected to the cable conductor at a respective point denominated by an x and the intervals between these points being denominated a, b, and c. The right end of cable 11' terminates in a pothead (not shown) such as that of FIG. 1 having a housing into which the three pilot wire conductors extend. Each conductor is connected to a respective Wheatstone bridge circuit such as Wheatstone bridge circuit 12 shown in FIG. 2, the output of which is connected to a respective voltage controlled oscillator. The pilot wire conductor connected to Wheatstone bridge circuit 64 extends along the entire length of conductor interval of a, b, and c; that connected to Wheatstone bridge circuit 65 extends the length of interval b and c; and the pilot wire conductor connected to Wheatstone bridge circuit 66 extends only along interval c of the cable. Bridge circuits 64, 65 and 66 are connected to respective voltage-controlled oscillators 67, 68 and 69, which produce modulation signals corresponding respectively to the average temperatures of intervals a, b and c, intervals b and c and interval c of cable conductor 11'. The outputs of the voltage-controlled oscillators are connected to a three-channel transmitter similar to transmitter 28 so that the output of the receiver indicates an average temperature corresponding to each of the last mentioned cable intervals. The average temperatures of each interval a, b and c can then be determined by simple arithmetic operations on various ones of the received signals, if the lengths of the respective intervals are known. For example, the average temperature of interval a is $$T(a) = \frac{T(abc)L(abc) - T(bc)L(bc)}{L(a)}$$

where $T(x)$ is the measured average temperature of the interval $x$ and $L(x)$ is the length of that interval. All of the measuring and transmitting apparatus shown in FIG. 8 may, similarly to the embodiment of FIG. 2, be continued in a housing mounted on the pothead. As stated above, in severe electrical environments, such housing is preferably conductive. A preferred form of such housing is one constructed of fiberglass or a similar moldable material, coated with a conductive paint. If desired, the several Wheatstone bridge circuit outputs may be connected to a single channel transmitter by a multiplexer such as will be familiar to those skilled in this art.

For measuring the average temperatures of plural intervals of a multiconductor cable, referred to above, one pilot wire may be provided in each such conductor and the respective pilot wires connected to their associated cable conductors at points corresponding to the intervals of FIG. 8. Single-channel transmitters on each pothead terminating a conductor may then transmit over different frequencies, for instance, to a common receiver.

It will be apparent that the invention is not limited to the specific features in the above-described preferred embodiments, and that various modifications may be made without departing from its scope as defined in the claims.

We claim:

1. Apparatus for measuring the average temperature of the length of current carrying conductor, comprising:

conductive means, the conductivity of which varies according to its temperature, electrically insulated from the current-carrying conductor along their common lateral extent and in thermal communication therewith along substantially its entire length, so that the conductor and the conductive means are at essentially the same temperature;

means for measuring the conductance of the conductive means;

a radio transmitter connected to the measuring means for transmitting signals representative of said conductance to a receiver; and a source of DC current supplying current to the measuring means, said measuring means including a Wheatstone bridge circuit, one arm of which includes said length of current-carrying conductor connected in series with the conductive means, said DC current source being connected diagonally across the Wheatstone bridge circuit for supplying current thereto.

2. Apparatus as defined in claim 1 wherein said source of DC current includes means for deriving AC power from the current carrying conductor and for rectifying said AC power to produce said DC current, said AC power deriving means being a transformer, the primary winding of which is said current-carrying conductor.

3. Apparatus for measuring the average temperature of a length of current-carrying conductor terminating at one end in a pothead, said apparatus comprising:

conductive means, the conductivity of which varies according to its temperature, electrically insulated from the current-carrying conductor along their common lateral extent and in thermal communication with said conductor along substantially its entire length, so that the conductor and the conductive means are at essentially the same temperatures;

a housing mounted on such pothead for excluding external electric and magnetic fields, said housing being formed of an electrically conductive material and provided with rounded edges for corona shielding;

means mounted in said housing for measuring the conductance of said conductive means; and a radio transmitter mounted in said housing and connected to said measuring means for transmitting signals representative of said conductance to a receiver.

4. Apparatus as defined in claim 3 wherein said radio transmitter includes a flush antenna mounted integrally with said housing for radiating said signals.

5. Apparatus as defined in claim 3 wherein said housing is formed integrally with such pothead.

6. Apparatus as defined in claim 3 including a corona ring mounted on such pothead, said housing being mounted on said corona ring.

7. In apparatus for electrically measuring and transmitting the value of a parameter characterizing a current-carrying cable, which cable terminates at one end in a pothead, the improvement comprising a housing integral with such pothead for excluding external electric fields, said housing being formed of an electrically conductive material and having rounded edges for corona shielding;

a flush antenna mounted integrally on said housing; and means within said housing for measuring the value of such parameter and including a radio transmitter connected to said antenna for transmitting signals representative of said value.

8. Apparatus as defined in claim 7 wherein said radio transmitter includes a biphase modulator.

* * * * *